(12) United States Patent
Benincasa et al.

(10) Patent No.: US 8,430,714 B2
(45) Date of Patent: Apr. 30, 2013

(54) MODULAR BEEHIVE CONSTRUCTION WITH INSULATING COVER PLATES

(76) Inventors: Michael S. Benincasa, Sonora, CA (US); David K. Buckman, Sonora, CA (US)

( * ) Notice: Subject to any disclaimer, the term of this patent is extended or adjusted under 35 U.S.C. 154(b) by 580 days.

(21) Appl. No.: 12/701,546

(22) Filed: Feb. 6, 2010

(65) Prior Publication Data

US 2011/0195633 A1 Aug. 11, 2011

(51) Int. Cl.
*A01K 47/00* (2006.01)

(52) U.S. Cl.
USPC .................................................. 449/30; 449/3

(58) Field of Classification Search ................ 449/3, 13, 449/29, 30, 32
See application file for complete search history.

(56) References Cited

U.S. PATENT DOCUMENTS

| | | | | |
|---|---|---|---|---|
| 52,622 A | * | 2/1866 | Taylor et al. | 449/30 |
| 66,680 A | * | 7/1867 | Cox | 449/30 |
| 1,270,507 A | * | 6/1918 | Fleming | 449/13 |
| 1,889,184 A | | 11/1932 | Siemers | |
| 2,652,601 A | * | 9/1953 | Slopa et al. | 52/790.1 |
| 3,968,531 A | | 7/1976 | Cartwright | |
| 4,199,832 A | | 4/1980 | Glasscock et al. | |
| 4,360,993 A | * | 11/1982 | Tomokazu et al. | 52/365 |
| 4,402,099 A | | 9/1983 | Platt, Jr. | |
| 4,478,019 A | * | 10/1984 | Thompson, Jr. | 52/239 |
| 5,741,170 A | | 4/1998 | Orletsky et al. | |

* cited by examiner

*Primary Examiner* — Rob Swiatek
(74) *Attorney, Agent, or Firm* — R. Michael West (57) ABSTRACT

A plastic modular beehive construction including cover plates to enhance insulation from cold temperatures. The construction comprises opposing side and end walls. Outwardly protruding ribs are provided across areas of the outer face of each wall for reinforcement. Pin receivers are also included in selected locations on each outer face. An outwardly facing recess is preferably included in each wall, to define a hand grip. Pronged connectors are provided on the end walls. Recesses are provided on the side walls for receiving the pronged connectors of the end walls. The walls are snapped together, providing a rigid four-sided hive, having an open top and an open bottom. The cover plates, including pins on an inner wall that correspond with the locations of the pin receivers on the walls, are installed over each wall. The plates include a cutout corresponding with the size, configuration, and location of the hand grip recess.

18 Claims, 6 Drawing Sheets

MODULAR BEEHIVE CONSTRUCTION WITH INSULATING COVER PLATES

CROSS-REFERENCE TO RELATED APPLICATION

Applicants herein are co-inventors of co-pending application Ser. No. 29/329,511, for an ornamental design of a Wall For Beehive, filed Dec. 16, 2008.

BACKGROUND OF THE INVENTION

1. Field of the Invention

The invention relates generally to plastic, modular constructions for beehives. More specifically, the invention pertains to a beehive construction including opposing side walls and opposing end walls provided with snap together connectors for quick and easy assembly. Insulating cover plates for the assembled hive are installed by aligning a cover plate with a respective beehive wall, and then pressing inwardly on the plate to interconnect locking means to secure the two structures together.

2. Description of the Prior Art

The adverse effects of cold weather on a bee colony were recognized in U.S. Pat. No. 1,889,184, issued to Siemers. In this arrangement, a separate casing wall structure including insulating material is employed. The wall structure surrounds the sides and top of a beehive, and includes a covered entrance tray, for ingress and egress of the bees to and from the structure.

U.S. Pat. No. 4,199,832 granted to Glasscock et al., advocates the use of certain formulations for high density polyurethane foam beehives which provide insulating characteristics to enhance the working efficiency of the colony. These formulations are also claimed not to have adverse health effects on the colony, characteristic of other formulations for polyurethane which include amine catalysts.

A Molded Plastic Beehive is shown in U.S. Pat. No. 3,968,531, issued to Cartwright. This construction for a plastic beehive "super" includes side walls and end walls interconnected through the use of tenons and openings associated with the walls. Cartwright prefers to mold the beehive "super" from polyethylene or polypropylene using conventional structural foam methods, claimed to provide good thermal insulating properties against heat and cold.

U.S. Pat. No. 5,741,170, issued to Orletsky et al., teaches a Modular Beehive system that houses a plurality of colonies of bees. The exterior walls 104 include an insulating core 111 made from an expanded polystyrene or other insulating foam. The inventors also advocate the use of an insulating core in the construction of roof 150, used to cover the system.

A Beehive For Improved Beekeeping In Tropical Countries is shown in U.S. Pat. No. 4,402,099, granted to Platt, Jr. The '099 patent shows the use of dovetail-like protrusions and notches, to interconnect plastic panels forming the beehive. It is also suggested that laminated plastic construction, having rigid or semi-rigid skins and a foam or corrugated plastic core provide the desired strength and durability for the plastic panels.

SUMMARY OF THE INVENTION

The plastic modular beehive construction disclosed herein includes cover plates adapted for tool-free installation over the walls of the beehive to enhance the overall insulating characteristics of the beehive. The insulating value of the plastic beehive construction when fitted with the cover plates, closely approximates that of prior art wooden beehive construction, effectively protecting the bee colony from colder temperatures.

The basic beehive construction comprises opposing side walls and opposing end walls, assembled through the use of snap-together connector fixtures to form a generally rectangular, four-sided housing. Each of the walls has a smooth inner face forming the interior side of the beehive, and an outer face including outwardly protruding ribs for structural reinforcement. Pin receivers are also included in selected locations on each outer face. An outwardly facing hand grip recess is preferably included in the outer face of each wall, to define a hand grip for lifting or re-locating the beehive.

Two pairs of cover plates are provided, one pair to cover the side walls and one pair to cover the end walls. Each cover plate is generally co-extensive in shape and size with the outer face of a respective beehive wall. Each cover plate includes an inner wall provided with pins that correspond with the locations of the pin receivers on a respective side or end wall. Each cover plate also preferably includes guide means protruding from its inner wall to nest into sliding engagement against peripheral portions of each wall. Each of the cover plates preferably includes a cutout corresponding with the size, configuration, and location of the hand grip recess.

After aligning a cover plate with the outer face of a respective wall, the cover plate is press-fitted and secured over the wall, defining an insulating dead air volume between the outer face of the wall and the inner wall of the cover plate.

DETAILED DESCRIPTION OF THE PREFERRED EMBODIMENT

Turning now to the drawings, the modular beehive construction 11 includes a pair of opposing, side walls 12, identical to each other in size and configuration. Each of the side walls 12 has vertical edge portions 13, with a smooth inner face 14 and an outer face 16 extending therebetween. Each of the side walls 12 further includes a plurality of pin receivers 17 in selected locations on each outer face 16.

Similarly, beehive construction 11 also includes a pair of opposing, end walls 18, which are identical to each other in size and configuration. Each of the end walls 18 has vertical edge portions 19, with a smooth inner face 21 and an outer face 22 extending therebetween. Each of the end walls 18 further includes a plurality of pin receivers 23 in selected locations on each outer face 22.

Also provided is means for interconnecting the vertical edge portions 13 of side walls 12 to respective vertical edge portions 19 of end walls 18, to form a four-sided beehive construction. Such means for interconnecting comprises prongs 24 and 26 on vertical edge portions 19 of end walls 18, and prong receivers 27 and 28 on vertical edge portions 13 of side walls 12.

Figures 3, 5, 6:
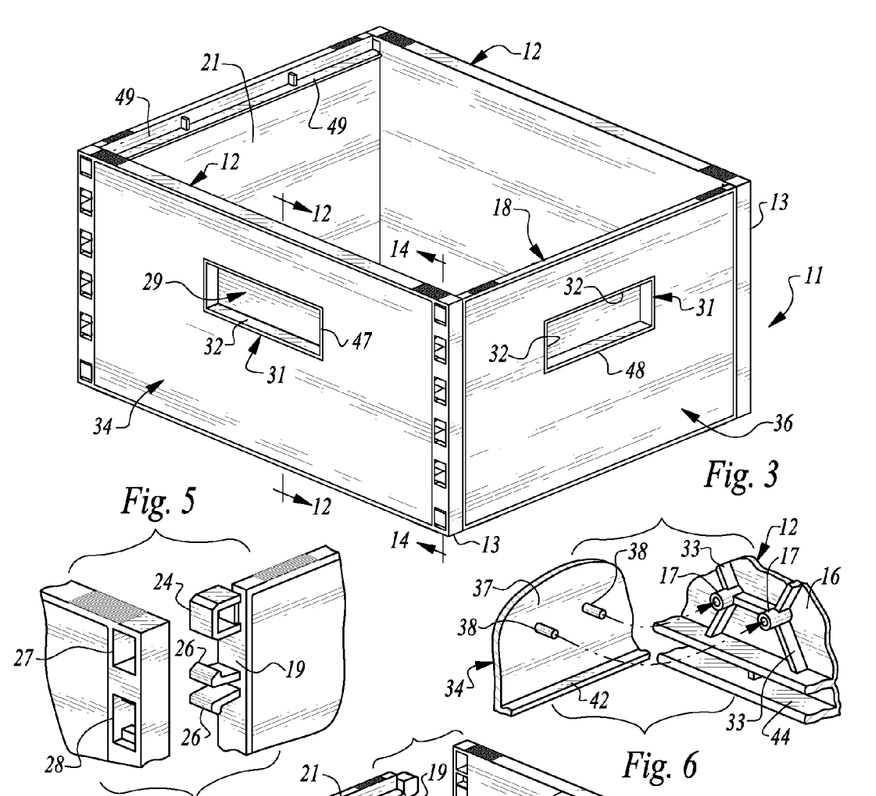
FIG. 3 is a perspective view of the beehive construction, showing a side wall hand grip and an end wall hand grip, and the shelf on one of the end walls to accommodate the frame support flanges.
FIG. 5 is a detail perspective view of the prongs and prong receivers used in the interconnecting means.
FIG. 6 is a detail perspective view of the pins and pin receivers, used to interlock a cover plate to a side wall or an end wall.
Figure 4:
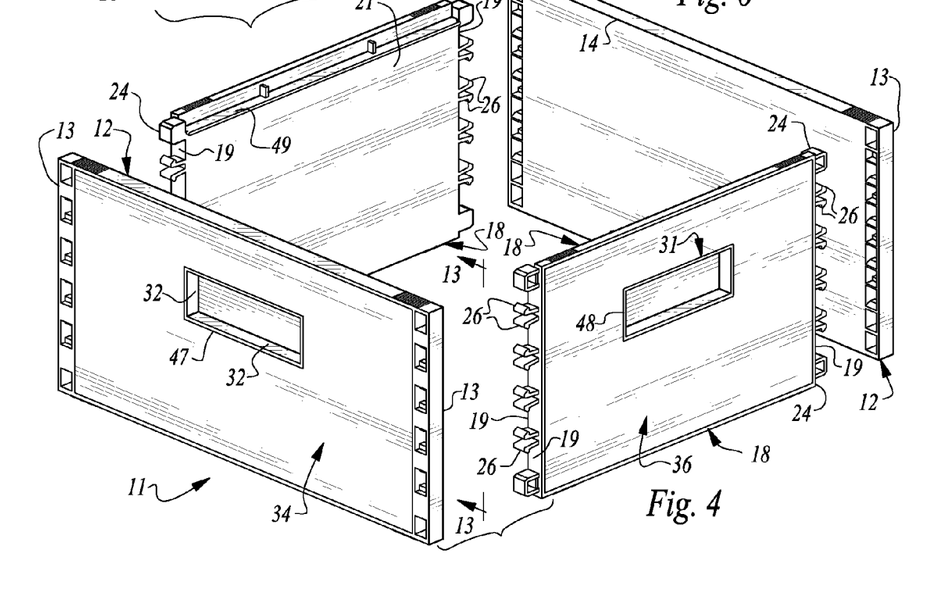
FIG. 4 is an exploded perspective view of the beehive construction, showing preferred means for interconnecting the vertical edge portions of the side walls to respective vertical edge portions of the end walls, to form the beehive construction.
Figure 13:
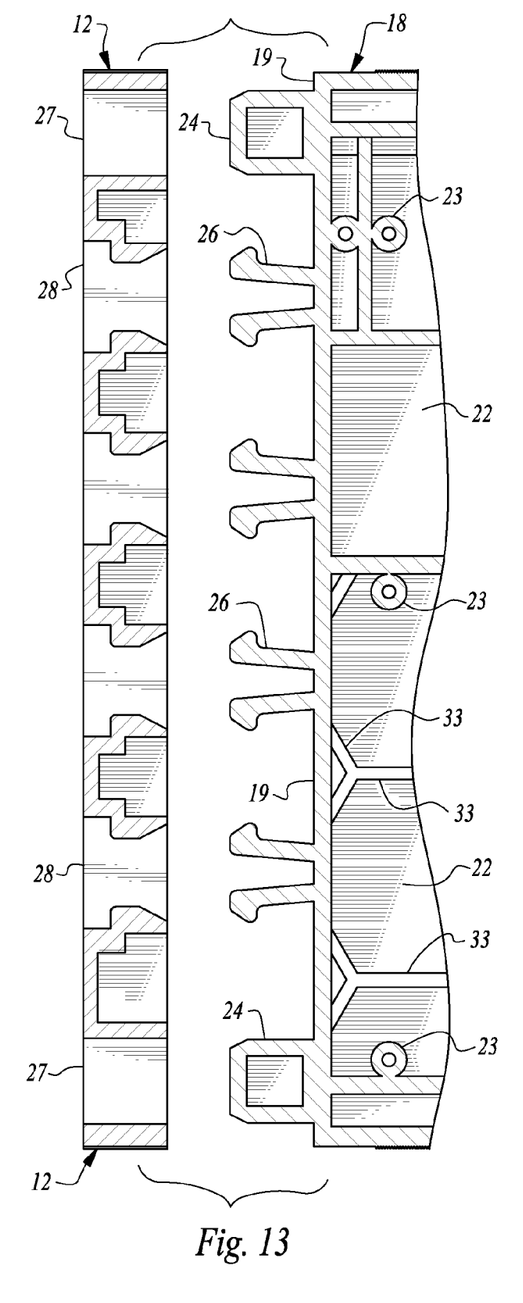
FIG. 13 is a fragmentary cross-sectional view taken on the line 13-13 in FIG. 4, showing the interconnecting prongs and prong receivers prior to coupling the prongs and the receivers.

Prongs 24 are generally rectangular in end elevation, as shown more particularly in FIGS. 5 and 13. Prongs 24 are relatively rigid, and being located on the upper and lower extremes of edge portions 19, perform the additional functions of providing alignment and structural integrity in the interconnection of the walls. Prongs 26, on the other hand, are resilient in nature, include barbs on their ends, and are arranged in opposing pairs. Prongs 26 primarily provide a locking function, in the interconnection of the side and end walls of the beehive construction 11.

Figure 14:
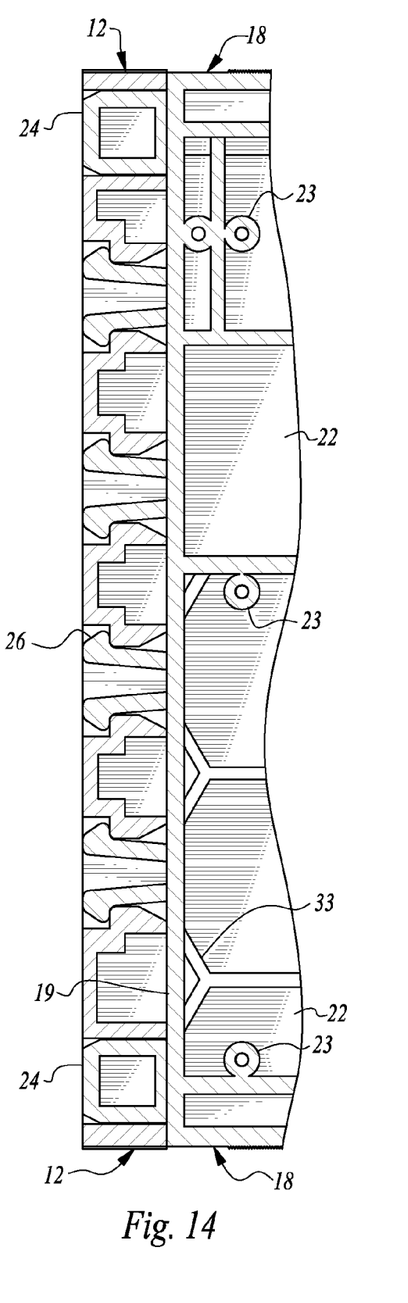
FIG. 14 is a fragmentary cross-sectional view taken on the line 14-14 in FIG. 3, showing the end wall being interconnected to the side wall; and, FIG. 15 is a graph, comparing temperature readings of the ambient air, a test wood hive, a test polypropylene hive with cover panels, and a test polypropylene hive without cover panels, measured over a period of time.

Prong receivers 27 are generally rectangular in elevation, and slightly larger in size when compared to prongs 24, so the prongs may easily be inserted. Prong receivers 28 include a series of beveled and stepped internal contours first to urge the resilient prongs 26 together upon partial insertion into the receiver, and then to allow the barbs of the prongs to spread apart and lock against the stepped contour. In that manner, the interconnection means disclosed herein provides a secure and quick, snap-like locking connection between the side and end walls. See, FIGS. 13 and 14.

It should be noted that many other interconnection arrangements could be used in lieu of the particular prong and receiver structures shown herein. For example, the prongs and the prong receivers could be of different shapes and numbers than those shown in the drawings. The prongs and prong receivers could be replaced with interlaced fingers and recesses, secured together with fasteners such as rods or screws. Or, self-threading screws alone, extending from one wall to the other, could be used to attach one wall edge to another.

An outwardly facing recess 29 is provided in outer face of at least one of the side walls 12 or at least one of the end walls 18 to define a hand grip 31. The size, shape, and depth of recess 29 is determined by hand grip peripheral portions 32, extending outwardly from the outer face of each side wall and each end wall. Preferably, recesses 29 are provided in each of the side walls 12 and the end walls 18, so the beekeeper will have convenient hand grips 31 available at both sides and both ends of the beehive construction 11, for easy handling.

Figure 7:
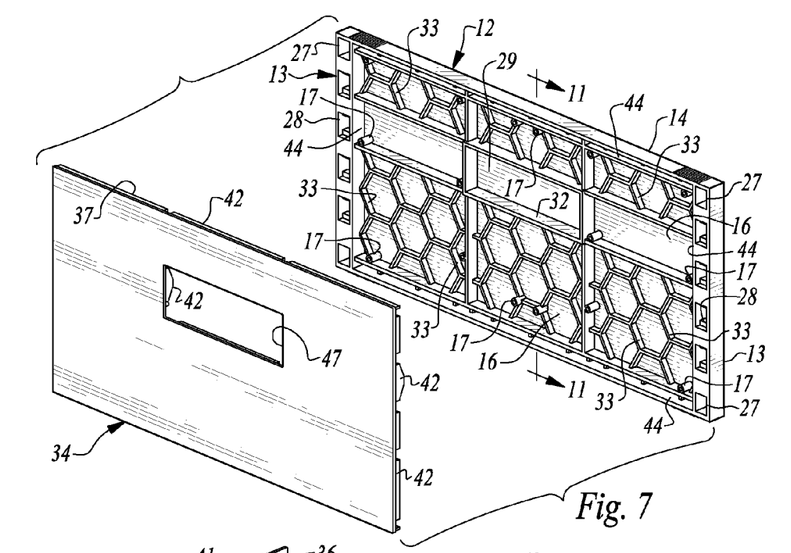
FIG. 7 is an exploded perspective view of a side wall and a cover plate, showing the cutout in the cover plate, and the hand grip recess and rib reinforcements in the side wall.
Figures 8, 9, 10:
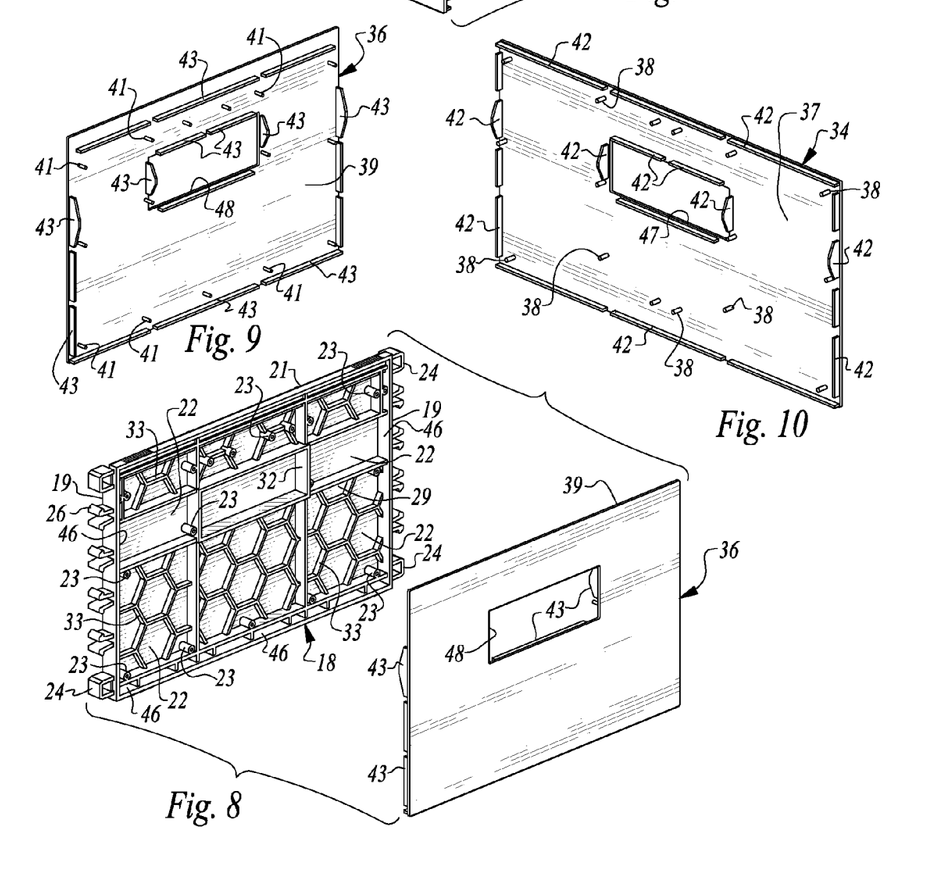
FIG. 8 is an exploded perspective view of an end wall and a cover plate, showing the locations of the pin receivers in the outer face of the end wall.
FIG. 9 is a perspective view of an end wall cover plate, showing the locations of the locking pins on the inner wall of the cover plate.
FIG. 10 is a perspective view of a side wall cover plate, showing the locations of the locking pins on the inner wall of the cover plate.
Figure 11:
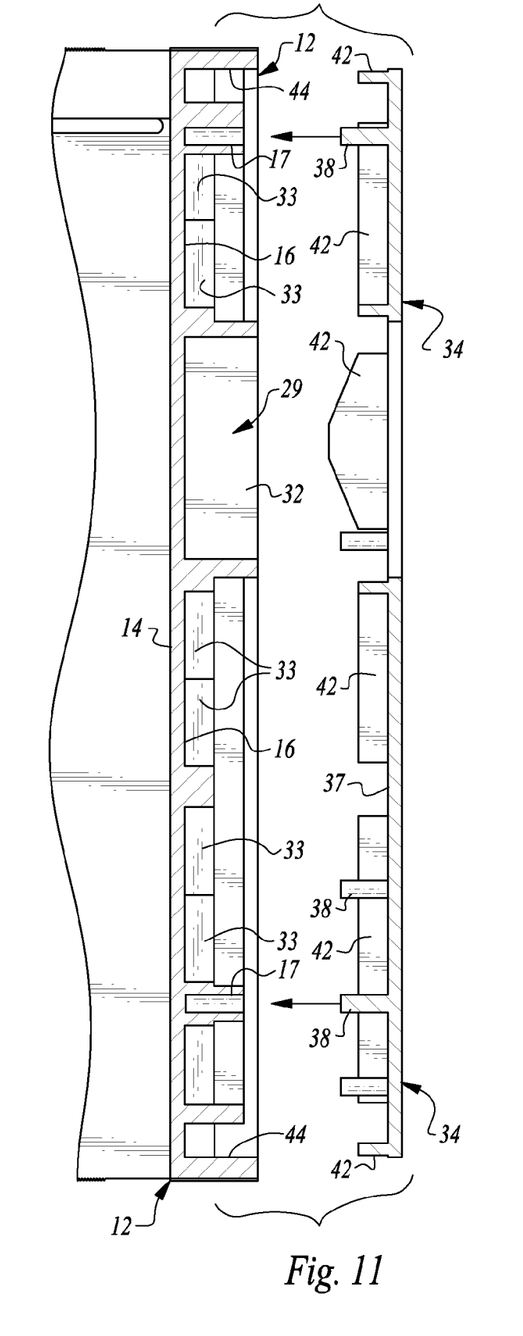
FIG. 11 is a fragmentary cross-sectional view taken on the line 11-11 in FIG. 7, showing the side wall and a cover plate prior to installation of the cover plate.
Figure 12:
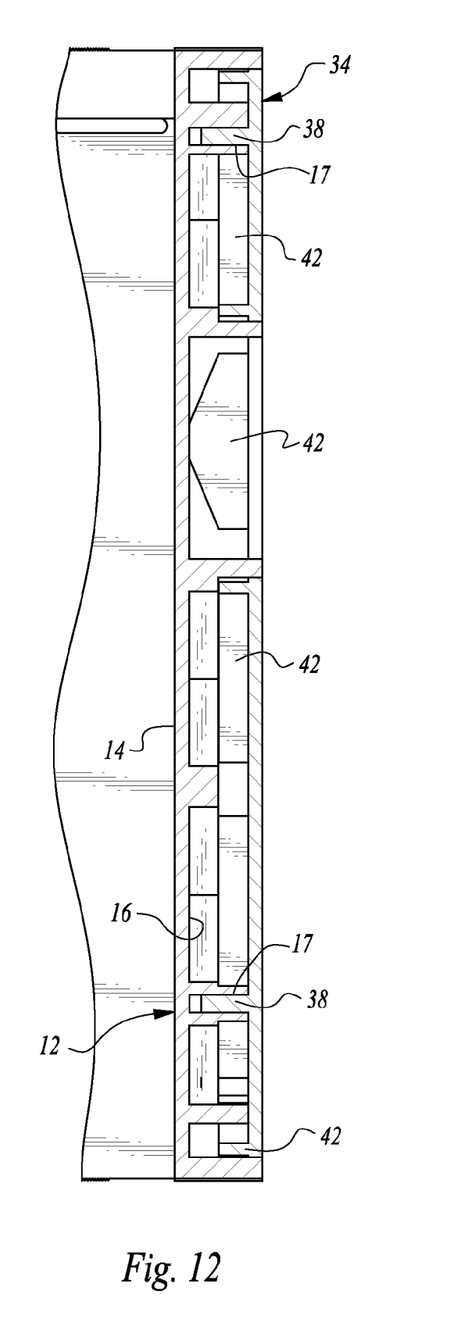
FIG. 12 is fragmentary cross-sectional view taken on the line 12-12 in FIG. 3, showing the cover plate installed over the side wall.

The outer face 16 of each side wall 12, and the outer face 22 of each end wall 18, includes outwardly extending reinforcement ribs 33. The preferred arrangement of ribs 33 generally resembles hexagons, or portions of hexagons, as shown particularly in FIGS. 7 and 8. However, other geometric shapes will work equally well to provide resistance from flexure or bending in side walls 12 and end walls 18. Ribs 33 are relatively short structures, and do not extend even half of the extent of the thickness of the walls. This can be appreciated in FIG. 11, where ribs 33 are shown in relation to other structures in the side wall 12, such as grip peripheral portions 32. By making ribs 33 the height as shown, an adequate amount of strength is provided in the wall while using a minimum amount of plastic material in the molding process.

Beehive construction 11 further includes a pair of side wall cover plates 34 and a pair of end wall cover plates 36. Cover plates 34 have an inner wall 37 including pins 38 that correspond respectively with the locations of the pin receivers 17 on the side walls 12. Similarly, cover plates 36 have an inner wall 39 including pins 41 that correspond respectively with the locations of pin receivers 23 on the end walls 18.

It is also preferred to provide inwardly protruding guide means 42 on inner wall 37 of cover plates 34, and guide means 43 on inner walls 39 of cover plates 36. Guide means 42 and 43 can assume a variety of shapes and configurations, such as short elongated walls and polygonal walls, depending upon the application and the location. But the principal functions of such guide means are to determine the registration of a particular cover plate over a respective wall, and to secure the edges of the cover plate to respective underlying peripheral edge portions of the respective wall.

As shown in the detail of FIG. 6, side wall 12 includes peripheral edge portions 44 extending outwardly from outer face 16. When side wall cover plate 34 is installed over side wall 12, pins 38 are inserted within pin receivers 17, and guide means 42 nests securely into sliding engagement, against peripheral edge portion 44. In substantial identical fashion, when end wall cover plate 36 is installed over end wall 18, pins 41 are inserted within pin receivers 23, and guide means 43 slides into secure contingent relation with a peripheral edge portion 46.

The hand grip 31 of each cover plate is a special case for use of guide means 42 and 43. Side wall cover plate 34 includes a hand grip cutout 47 corresponding to the size, configuration, and location of recess 29 in side wall 12. Guide means 42 is provided around the periphery of cutout 47, to engage grip peripheral portions 32 around recess 29 in side wall 12 when cover plate 34 is secured over side wall 12.

Likewise, end wall cover plate 36 includes a hand grip cutout 48, corresponding to the size, configuration, and location of recess 29 in end wall 18. Guide means 43 is provided around the periphery of cutout 48, to engage grip peripheral portion 32 around recess 29 in end wall 18 when cover plate 36 is installed over end wall 18.

A recessed shelf 49 is provided along the upper edge of each end wall 18. Shelf 49 extends entirely across each end wall, to provide a continuous support for honeycomb frame 51. For that purpose, lips 52 are provided on the ends of each frame 51. When each frame 51 is lowered into the beehive, the lips rest upon a respective shelf 49 to support the frame in suspended relation.

The first step in assembling the modular beehive construction 11 is undertaken by snapping together side walls 12 walls with end walls 18, to form a generally rectangular, four-sided housing. Then, each said side wall cover plate 34 is installed over a respective side wall 12, each end wall cover plate 36 is installed over a respective end wall 18. As each cover plate is installed, the pins enter into a respective pin receiver and the guide means slidably engage respective peripheral edge portions. With the cover plates 34 and 36 installed (see, FIG. 3), an insulating dead air volume is defined between each outer face of a wall and each inner wall of a respective cover plate.

It should be noted that the attachment of the cover plates can be undertaken before the side walls and the end walls are snapped together. Likewise, the cover plates can be retrofitted to a pre-existing beehive construction that does not include the cover plates. Thus, a beekeeper can retrofit beehives with the cover plates at any time, in the event more insulation and protection from colder temperatures is desired.

Figures 1, 2:
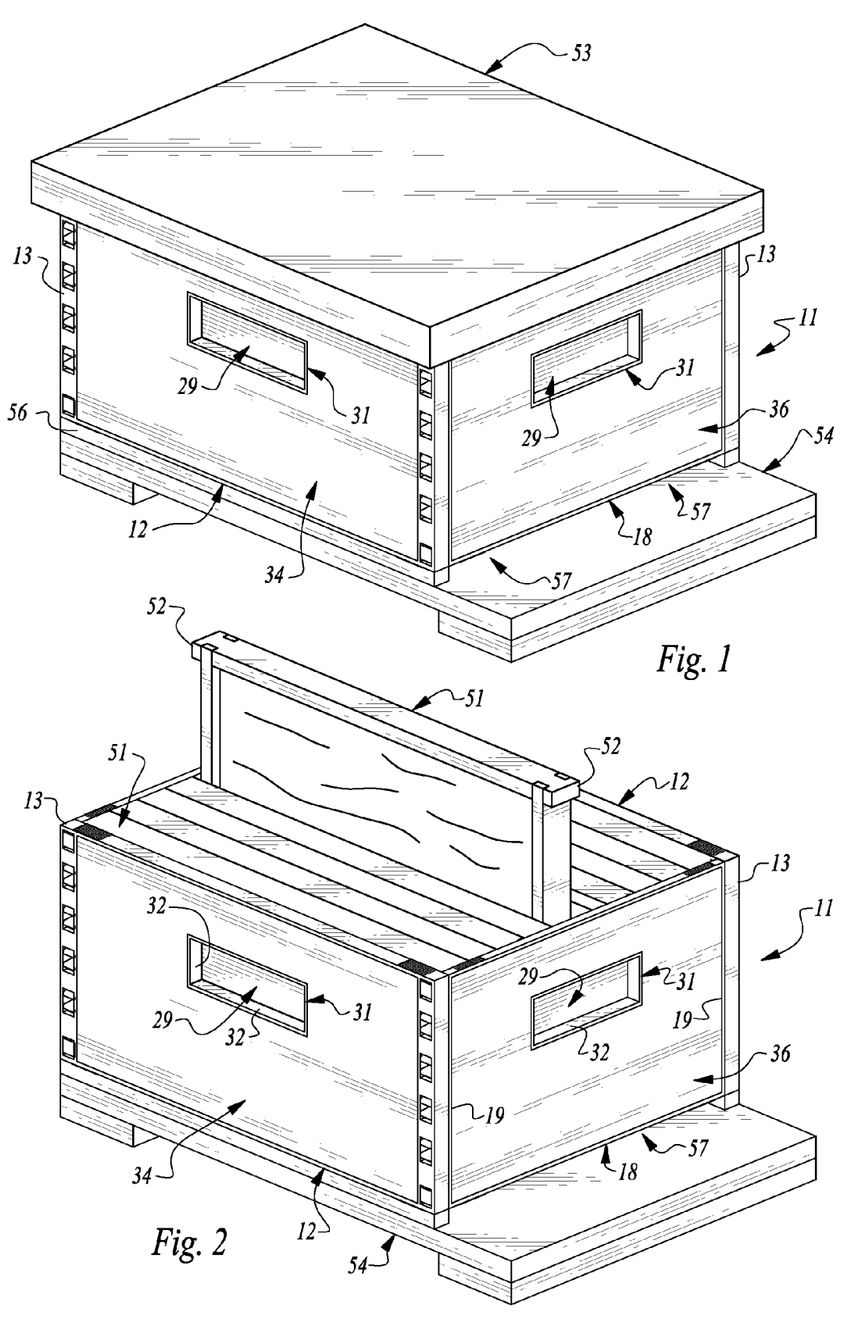
FIG. 1 is a perspective view of the beehive construction, provided with an upper top cover and a lower base plate to form a basic beehive.
FIG. 2 is a view as in FIG. 1, but with the top cover removed, and one of the honeycomb frames being partially lifted out of the hive, for illustrative purposes.

FIG. 1 shows the modular beehive construction 11, provided with an upper top cover 53 and a lower base plate 54 to form a basic beehive. Top cover 53 is sized and configured to rest in sealing engagement over the upper edges of side walls 12 and end walls 18. As shown in FIG. 2, top cover 53 may be removed to allow access to honeycomb frames 51, to harvest honey and attend to the colony. Base plate 54 includes a U-shaped cleat 56 that supports beehive construction on two sides and one end, in spaced relation above the surface of plate 54. This provides an access slot 57, for ingress and egress of the bees.

Several of the objectives of the beehive construction 11 are to provide generally the same insulating characteristics of a conventional beehive manufactured from wood, while at the same time providing improved durability with less maintenance when compared to wooden beehives. The insulating characteristics of several beehive constructions are graphed in FIG. 15, in comparison with varying ambient temperatures over a period of time. A first beehive construction was made using wood, representing a typical prior art beehive in use for many years. The second beehive construction is the modular beehive construction 11, described above, manufactured from polypropylene and including cover panels. A third beehive construction is identical to the modular beehive construction 11, but without the cover panels. All three beehive constructions were subjected to the identical ambient temperatures, and internal temperature readings were measured and recorded simultaneously.

Figure 15:
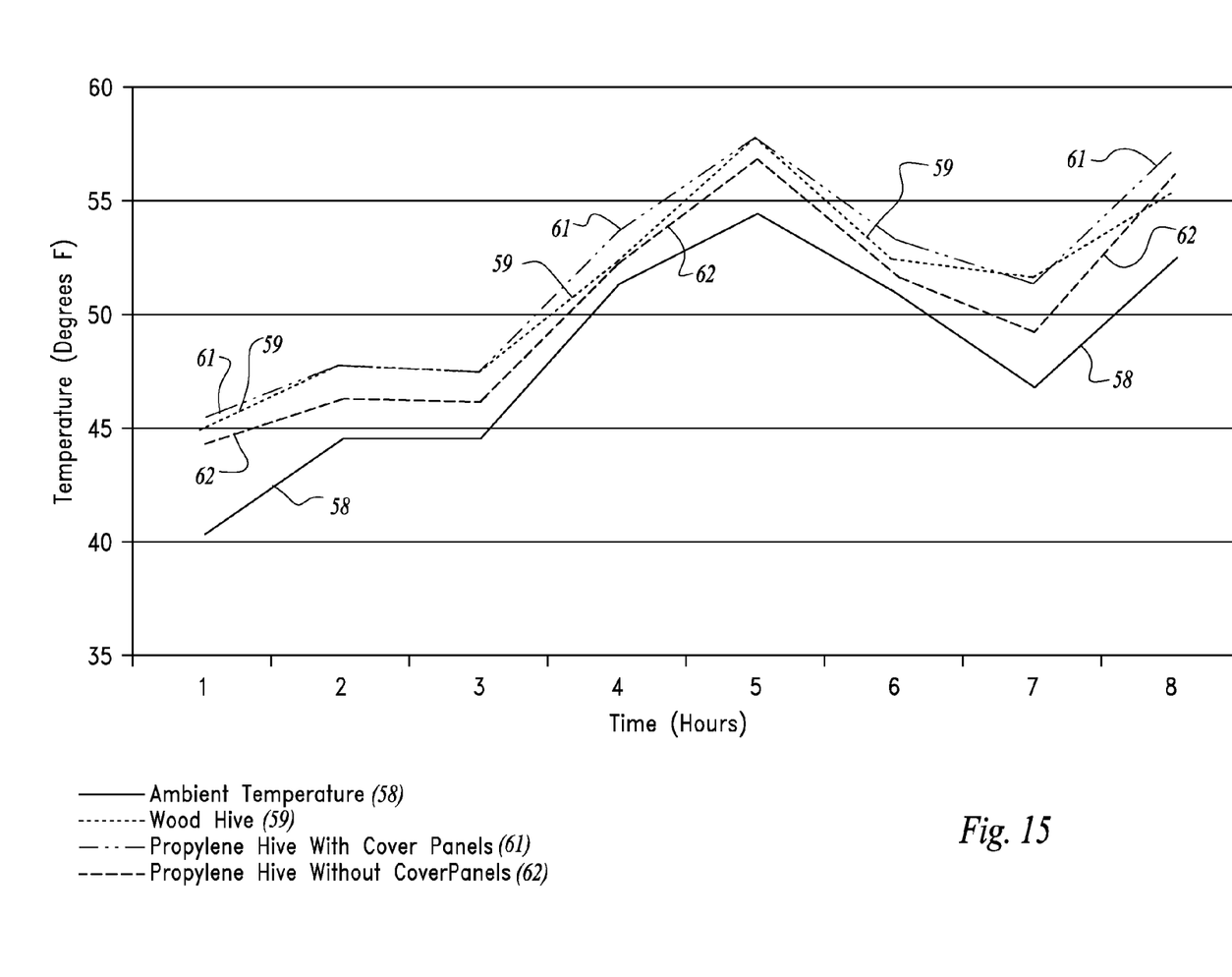

Ambient exterior temperature readings are indicated by graph line 58. Temperatures recorded within the wooden beehive are shown by graph line 59. Temperatures recorded within the modular beehive construction 11 with the cover panels are depicted by the graph line 61. Temperatures recorded within a modular polypropylene construction without the cover panels are shown by the graph line 62. It will be appreciated that the modular beehive construction 11 provides insulating characteristics that are very similar, and in some cases better, than the wooden beehive. In contrast, the polypropylene beehive construction without the cover panels exhibits consistently poorer insulating characteristics, compared either to the modular beehive construction with the cover panels, or the wooden beehive.

What is claimed is:

1. A plastic modular beehive construction comprising:
   a. a pair of opposing side walls, each of said side walls including vertical edge portions with an inner face and an outer face extending therebetween, said side walls further including a plurality of pin receivers in selected locations on each outer face of said side walls;
   b. a pair of opposing end walls, each of said end walls including vertical edge portions with an inner face and an outer face extending therebetween, said end walls further including a plurality of pin receivers in selected locations on each outer face of said end walls;
   c. means for interconnecting said vertical edge portions of said side walls to respective vertical edge portions of said end walls, to form a four-sided beehive construction; and,
   d. a pair of side wall cover plates and a pair of end wall cover plates, each of said cover plates having an inner wall and including pins on said inner wall that correspond respectively with the locations of the pin receivers on said side walls and said end walls, one of said side wall cover plates being installed over a respective one of said side walls and one of said end wall cover plates being installed over a respective one of said end walls, by inserting said pins into said pin receivers, thereby defining an insulating dead air volume between each said outer face and each said inner wall of a respective cover plate.

2. An apparatus as in claim 1 including an outwardly facing recess in said outer face of at least one of said side walls to define a hand grip.

3. An apparatus as in claim 2 further including a cutout in said side wall cover plate over said at least one side wall, said cutout corresponding in size, configuration, and location with said recess in said outer face of said at least one side wall.

4. An apparatus as in claim 1 including an outwardly facing recess in said outer face of at least one of said end walls to define a hand grip.

5. An apparatus as in claim 4 further including a cutout in said end wall cover plate over said at least one end wall, said cutout corresponding in size, configuration, and location with said recess in said outer face of said at least one end wall.

6. An apparatus as in claim 1 including reinforcement ribs extending outwardly from said outer face of said side walls and said end walls.

7. An apparatus as in claim 6 in which said reinforcement ribs comprise a geometric shape.

8. An apparatus as in claim 1 further including guide means on said inner wall of at least one of said cover plates, for determining registration of said at least one cover plates over a respective one of either said side walls or said end walls.

9. An apparatus as in claim 8 in which said guide means comprises protrusions on said inner wall that nest into sliding engagement against peripheral portions in said outer face of a respective one of either said side walls or said end walls.

10. An apparatus as in claim 8 in which said guide means are provided around said hand grip recess and said cutout.

11. An apparatus as in claim 1 in which said side walls, said end walls, and said covers are manufactured from polypropylene.

12. An apparatus as in claim 1 in which said means for interconnecting comprises resilient prongs on said vertical edge portions of said end walls and prong receivers on said vertical edge portions of said side walls.

13. A plastic modular beehive construction comprising:
a. a pair of opposing side walls, each of said side walls including vertical edge portions with an inner face and an outer face extending therebetween;
b. a pair of opposing end walls, each of said end walls including vertical edge portions with an inner face and an outer face extending therebetween;
c. means for interconnecting said vertical edge portions of said side walls to respective vertical edge portions of said end walls, to form a four-sided beehive construction;
d. a pair of side wall cover plates and a pair of end wall cover plates, each of said cover plates having an inner wall; and,
e. means for interlocking said side wall cover plates to said side walls and said end wall cover plates to said end walls, said interlocking means having one portion on each said outer face of said side walls and said end walls, and another portion on each said inner wall of said side wall cover plates and said end wall cover plates, thereby defining an insulating dead air volume between each said outer face and each said inner wall of a respective cover plate.

14. An apparatus as in claim 13 in which said means for interconnecting comprises resilient prongs on said vertical edge portions of said end walls and prong receivers on said vertical edge portions of said side walls.

15. An apparatus as in claim 13 in which said means for interlocking comprises a plurality of pin receivers in selected locations on each outer face of said side walls, and a plurality of pin receivers on each outer face of said end walls corresponding in location to said selected locations when said cover plates are installed over said side walls and said end walls.

16. An apparatus as in claim 13 including an outwardly facing recess in said outer face of either at least one of said side walls or at least one of said end walls to define a hand grip.

17. An apparatus as in claim 16 further including a cutout in a cover plate over said at least one side wall or said at least one end wall, said cutout corresponding in size, configuration, and location with said recess in said outer face of said at least one side wall or said at least one end wall.

18. An apparatus as in claim 13 including reinforcement ribs extending outwardly from said outer face of said side walls and said end walls.

\* \* \* \* \*